US011681527B2

(12) United States Patent
Lin et al.

(10) Patent No.: US 11,681,527 B2
(45) Date of Patent: Jun. 20, 2023

(54) ELECTRONIC DEVICE AND MULTIPLEXING METHOD OF SPATIAL

(71) Applicant: RAYMX Microelectronics Corp., Hefei (CN)

(72) Inventors: Shuai Lin, Hefei (CN); Zhaoyao Hu, Hefei (CN)

(73) Assignee: RAYMX MICROELECTRONICS CORP., Hefei (CN)

( * ) Notice: Subject to any disclaimer, the term of this patent is extended or adjusted under 35 U.S.C. 154(b) by 219 days.

(21) Appl. No.: 17/135,088

(22) Filed: Dec. 28, 2020

(65) Prior Publication Data

US 2022/0156074 A1 May 19, 2022

(30) Foreign Application Priority Data

Nov. 18, 2020 (CN) .......................... 202011294814.2

(51) Int. Cl.
*G06F 9/30* (2018.01)
*G06F 3/06* (2006.01)
*G06F 9/38* (2018.01)

(52) U.S. Cl.
CPC .......... *G06F 9/30047* (2013.01); *G06F 3/061* (2013.01); *G06F 3/0659* (2013.01); *G06F 3/0671* (2013.01); *G06F 9/3836* (2013.01)

(58) Field of Classification Search
CPC .... G06F 9/30047; G06F 3/061; G06F 3/0659; G06F 3/0671; G06F 3/3836

USPC ......................................................... 712/225
See application file for complete search history.

(56) References Cited

U.S. PATENT DOCUMENTS

| | | | | |
|---|---|---|---|---|
| 2013/0212341 | A1* | 8/2013 | Tardif | G11B 20/10046 711/154 |
| 2018/0048518 | A1* | 2/2018 | Ihara | H04L 41/0654 |
| 2020/0249943 | A1* | 8/2020 | Raisch | G06F 11/0772 |
| 2021/0182219 | A1* | 6/2021 | Benisty | G06F 11/1048 |

OTHER PUBLICATIONS

"NVM Express", Sep. 23, 2013, Intel Corporation, Revision 1.1a, pp. 1-2 and 44-49 (Year: 2013).*

* cited by examiner

*Primary Examiner* — Chun Kuan Lee
(74) *Attorney, Agent, or Firm* — McClure, Qualey & Rodack, LLP (57) ABSTRACT

An electronic device includes a memory, a processor, and functional hardware. The memory includes a queue. The processor is configured to write a processing instruction into a target area of the queue. The functional hardware is configured to read the processing instruction from the target area and reserve the target area. The functional hardware generates a completion message according to the processing instruction, and writes the completion message into the target area after the processing instruction is executed. The completion message corresponds to the processing instruction.

17 Claims, 7 Drawing Sheets

FIG. 11

ELECTRONIC DEVICE AND MULTIPLEXING METHOD OF SPATIAL

CROSS-REFERENCE TO RELATED APPLICATION

This non-provisional application claims priority under 35 U.S.C. § 119(a) to Patent Application No. 202011294814.2 filed in China, P.R.C. on Nov. 18, 2020, the entire contents of which are hereby incorporated by reference.

BACKGROUND

Technical Field

The present invention relates to a storage space use technology, and in particular, to an electronic device and a space reusing method that can improve the storage utilization.

Related Art

When a system operates, to complete functions of the entire system, a processor can schedule at least one functional hardware through a bus to perform related operations and data processing. Generally, the processor assigns an execution task to a functional hardware through a processing instruction. After executing the task, the functional hardware feeds back to the processor through a completion message.

The conventional system needs to allocate two independent storage spaces (e.g. ping-pong buffer, double buffer) to respectively write the processing instruction and read the completion message, much storage space is occupied.

SUMMARY

The present invention provides an electronic device. In an embodiment, the electronic device includes a memory, a processor, and functional hardware. The memory includes a queue. The processor is configured to write at least one processing instruction into at least one target area of the queue. The functional hardware is configured to read the at least one processing instruction from the at least one target area and to reserve the at least one target area. The functional hardware generates at least one completion message according to the at least one processing instruction, and writes the at least one completion message into the at least one target area after the at least one processing instruction is executed, where the at least one completion message corresponds to the at least one processing instruction.

The present invention provides a space reusing method. In an embodiment, the space reusing method includes: determining the size of at least one target area according to at least one processing instruction, where the at least one target area is in a queue of a memory; writing the at least one processing instruction into the at least one target area in the queue of the memory; reading the at least one processing instruction from the at least one target area and reserving the at least one target area; generating at least one completion message according to the at least one processing instruction; writing the at least one completion message into the at least one target area after the at least one processing instruction is executed; and reading the at least one completion message from the at least one target area.

Detailed features and advantages of the present invention are described in detail in the following implementations, and the content of the implementations is sufficient for a person skilled in the art to understand and implement the technical content of the present invention. A person skilled in the art can easily understand the objectives and advantages related to the present invention according to the contents disclosed in this specification, the claims and the drawings.

DETAILED DESCRIPTION

To make the objectives, features, and advantages of the embodiments of the present invention more comprehensible, the following provides detailed descriptions with reference to the accompanying drawings.

Figure 1:
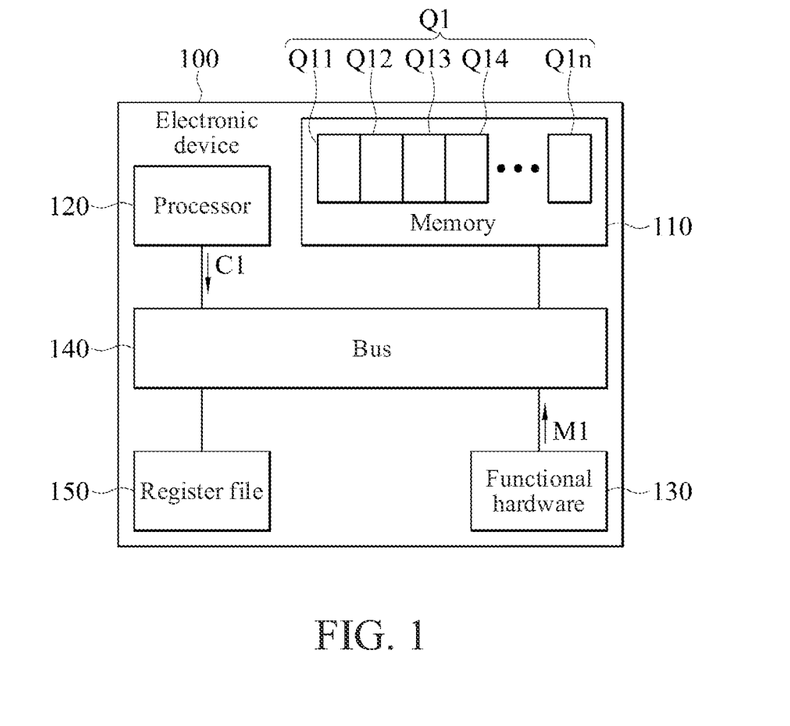
FIG. 1 is a schematic block diagram of an embodiment of an electronic device according to the present invention.

Referring to FIG. 1, an electronic device 100 includes a memory 110, a processor 120, and functional hardware 130. The memory 110 is coupled to the processor 120 and the functional hardware 130. The quantity of each component is not limited thereto, and for ease of description, one is used as an example. In some embodiments, the processor 120 and the functional hardware 130 may be separately coupled to the memory 110 through a bus 140.

The memory 110 includes a queue Q1, and the queue Q1 may include a plurality of storage blocks Q11 to Q1n in series. In some embodiments, n is a positive integer greater than 1, and the value of n (that is, the size of the queue Q1) may be preset by the processor 120. However, the size of the queue Q1 is not fixed thereto, and after setting the size, the processor 120 may dynamically adjust the size according to a frequency of access of the processor to the queue Q1, to effectively utilize the space of the memory 110. In some implementation aspects, the memory 110 may be, for example, but is not limited to, a static random access memory (SRAM), a dynamic random access memory (DRAM), or a flash memory.

The processor 120 may be configured to generate a processing instruction C1 and write the processing instruction C1 into the queue Q1 of the memory 110 through the bus 140. The functional hardware 130 may obtain the processing instruction C1 from the queue Q1 through the bus 140 and execute the processing instruction. After executing the processing instruction C1, the functional hardware 130 may generate a completion message M1 according to an execution result, and write the completion message M1 into the queue Q1 of the memory 110. The completion message M1 corresponds to the processing instruction C1. Particularly, the electronic device 100 in any embodiment of the present invention can perform a space reusing method in any embodiment, to improve the storage utilization of the memory 110.

In some implementation aspects, the processor 120 may be implemented by using a system-on-chip (SoC), a central processing unit (CPU), a microcontroller (MCU), an embedded controller, an application-specific integrated circuit (ASIC), an application processor (AP), or any other applicable electronic component. In addition, the functional hardware 130 may be various hardware components, for example, but not limited to a video De/Encoder, a network controller, a hardware accelerator, a an Interface controller, or a codec controller.

Figure 2:
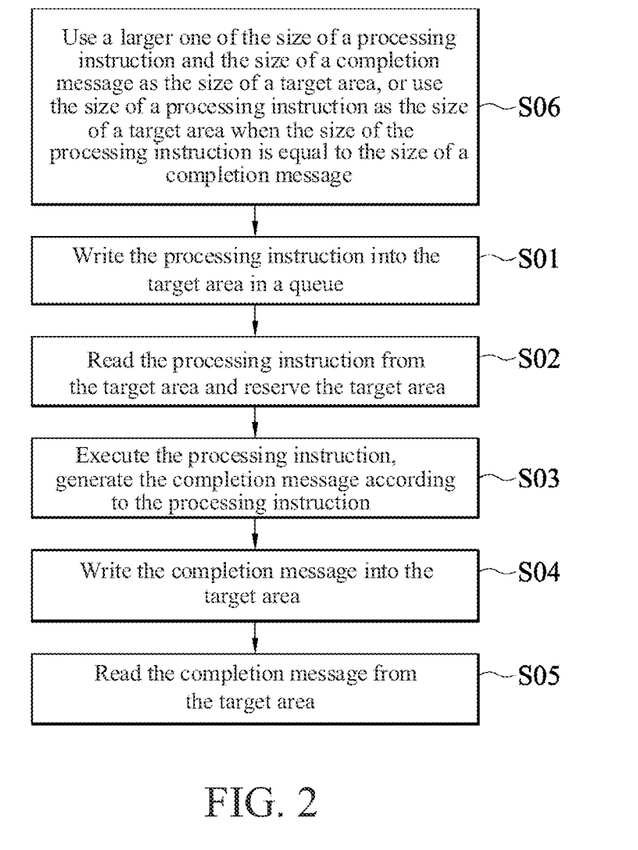
FIG. 2 is a schematic flowchart of an embodiment of a space reusing method according to the present invention.
Figure 3:
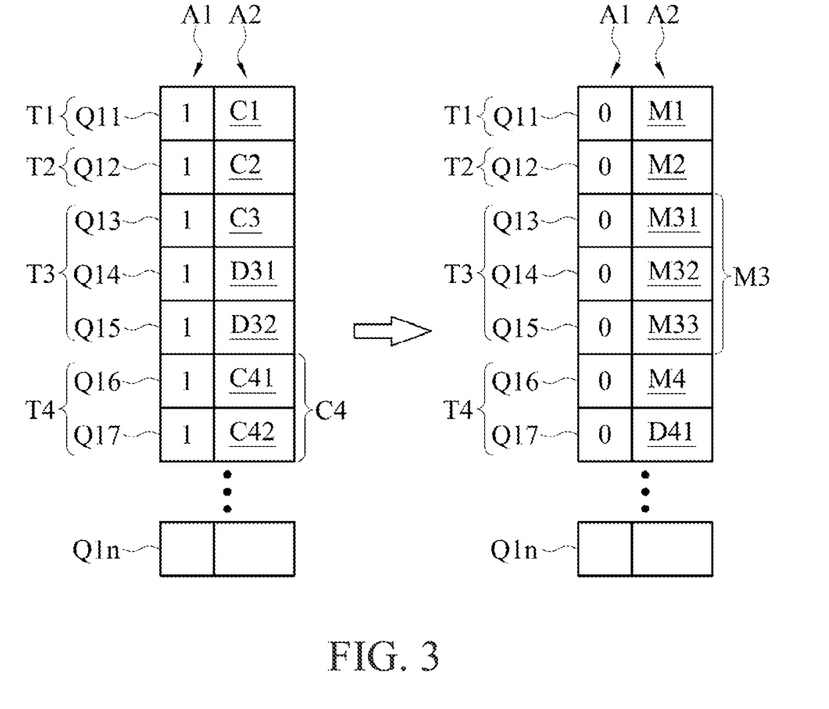
FIG. 3 is a schematic diagram of an embodiment in which a processing instruction and a completion message reuse a space in a queue.

Referring to FIG. 1 to FIG. 3, in an embodiment of the space reusing method, after generating the processing instruction C1, the processor 120 of the electronic device 100 may write the processing instruction C1 into a target area T1 of the queue Q1 (step S01). The target area T1 includes at least one of the plurality of storage blocks Q11 to Q1$n$, and a quantity of storage blocks covered by the target area T1 may be determined by the processor 120. The functional hardware 130 of the electronic device 100 may read the processing instruction C1 from the target area T1 (step S02) and reserve the target area T1, and then execute the processing instruction C1, and generate the completion message M1 according to the processing instruction C1 (step S03). Then, the functional hardware 130 writes the completion message M1 into the target area T1 of the queue Q1 (step S04) (after the processing instruction is executed). In this way, the processing instruction C1 and the completion message M1 can reuse the same storage space (that is, the target area T1), thereby improving the storage utilization. In addition, the processor 120 may further read the completion message M1 from the target area T1 (step S05), to learn, according to the completion message M1, an execution status of the processing instruction C1, for example, execution success, execution failure, or error occurrence. In some embodiments, the functional hardware is configured to reserve the at least one target area until the at least one completion message is written into the at least one target area.

The processor 120 may be further configured to generate a plurality of processing instructions C1 to C4. Therefore, in an embodiment of step S01, the processor 120 may write the plurality of processing instructions C1 to C4 into a plurality of target areas T1 to T4 of the queue Q1. Each of the processing instructions C1 to C4 may correspond to one of the plurality of target areas T1 to T4. For example, the processor 120 may respectively plan corresponding target areas T1 to T4 in the queue Q1 according to the processing instructions C1 to C4, and respectively write the processing instructions C1 to C4 into the target areas T1 to T4. For example, the processor 120 may respectively write the processing instructions C1 to C4 into the target areas T1 to T4 in sequence. The target areas T1 to T4 may be sequentially connected in series. For example, the target area T1 covers the storage block Q11, the target area T2 covers the storage block Q12 and is connected in series behind the target area T1, the target area T3 covers the storage blocks Q13 to Q15 and is connected in series behind the target area T2, and the target area T4 covers the storage blocks Q16 and Q17 and is connected in series behind the target area T3. Quantities of storage blocks covered by the target areas T1 to T4 may be different, and a decision on the quantities of storage blocks covered by the target areas T1 to T4 is described in detail below.

Correspondingly, in an embodiment of step S02 to step S04, the functional hardware 130 may read the processing instructions C1 to C4 from the target areas T1 to T4 (and reserve the target areas T1 to T4), to execute the processing instructions C1 to C4 respectively. After executing the processing instructions C1 to C4 respectively, the functional hardware 130 may respectively generate corresponding completion messages M1 to M4, and respectively store the completion messages M1 to M4 into the corresponding target areas T1 to T4. For example, the functional hardware 130 generates the completion message M1 after executing the processing instruction C1, and stores the completion message M1 into the target area T1, to reuse the storage space (that is, the target area T1) that has been used by the processing instruction C1. Analogy is performed in sequence until the processing instruction C4. The functional hardware 130 generates the completion message M4 after executing the processing instruction C4, and stores the completion message M4 into the target area T4, to reuse the storage space (that is, the target area T4) that has been used by the processing instruction C4. Correspondingly, in an embodiment of step S05, the processor 120 may read the completion messages M1 to M4 from the target areas T1 to T4, to learn execution statuses of the processing instructions C1 to C4 according to the completion messages M1 to M4.

It should be noted that, the present invention is not limited to a case that step S02 to step S04 are performed only after step S01 is entirely performed. Even if the processor 120 is still storing another processing instruction into a target area of the queue Q1 (that is, step S01 is still being performed), as long as there is a processing instruction that is not executed in the queue Q1, the functional hardware 130 may perform step S02 to step S04. For example, the processing instruction C1 has been stored into the target area T1 of the queue Q1, and the processor 120 subsequently writes the processing instruction C2 into the target area T2. In this case, the functional hardware 130 may start to perform step S02 to step S04, that is, the functional hardware 130 may fetch the processing instruction C1 from the target area T1 and execute the processing instruction, and store the completion message M1 generated after the processing instruction is executed into the target area T1. Similarly, in step S05, as long as there is a completion message in the queue Q1, the processor 120 may fetch the completion message from the queue Q1. Furthermore, the processor 120 may even start to perform step S05 after completion messages stored in the queue Q1 are accumulated to a specific quantity.

In addition, the present invention is not limited to a case that the functional hardware 130 needs to fetch all processing instructions currently stored in the queue Q1 at a time in step S02. For example, the processing instructions C1 to C4 have been respectively stored into the target areas T1 to T4 of the queue Q1, and the functional hardware 130 may first fetch and execute only the processing instructions C1 and C2 in the target areas T1 and T2, to respectively generate the completion messages M1 and M2. After respectively storing the completion messages M1 and M2 into the target areas T1 and T2, the functional hardware 130 then fetches and executes the processing instructions C3 and C4 in the target areas T3 and T4. A quantity of instructions that the functional hardware 130 can execute at a time depends on the processing capability of the functional hardware.

In some embodiments, the processor 120 predetermines the sizes of the completion messages M1 to M4 according to the processing instructions C1 to C4. Specifically, the processor 120 can learn the sizes of the processing instructions C1 to C4 when generating the processing instructions C1 to C4. Moreover, the processor 120 may learn the sizes of the corresponding completion messages M1 to M4 in advance according to the processing instructions C1 to C4. For example, the processor 120 may learn the sizes of the corresponding completion messages M1 to M4 according to the instruction types of the processing instructions C1 to C4. In addition, a size ratio of the processing instruction of each instruction type to the corresponding completion message may be agreed in advance, for example, may be declared through a program.

To enable the completion messages M1 to M4 to be stored into places in which the corresponding processing instructions C1 to C4 have been stored in the queue Q1 without covering other processing instructions, before step S01, the size of at least one target area is determined (in advance) according to at least one processing instruction, where the at least one target area is in a queue of a memory. Specifically, the processor 120 may further use larger ones of the sizes of the processing instructions C1 to C4 and the sizes of the corresponding completion messages M1 to M4 (the predetermined sizes of the completion messages M1 to M4) as the sizes of the target areas T1 to T4; or use, when the sizes of the processing instructions C1 to C4 are equal to the sizes of the corresponding completion messages M1 to M4, the sizes of the processing instructions C1 to C4 as the sizes of the target areas T1 to T4 (step S06).

For example, it is assumed that the processor 120 has learned that when being stored in the queue Q1, the processing instruction C1 needs to occupy a storage block, and the corresponding completion message M1 also needs to occupy a storage block. In this case, the size of the processing instruction C1 is approximately equal to the size of the completion message M1, so that the processor 120 may use the size of the processing instruction C1 as the size of the target area T1, and the planned target area T1 includes a storage block Q11. In another example, it is assumed that the processor 120 has learned that when being stored in the queue Q1, the processing instruction C3 needs to occupy a storage block, and the corresponding completion message M3 needs to occupy three storage blocks. In this case, the size of the completion message M3 is larger, so that the processor 120 may use the size of the completion message M3 as the size of the target area T3, and the planned target area T3 includes three storage blocks Q13 to Q15. As shown in FIG. 3, the completion message M3 may be divided into three sub-completion messages M31 to M33, and the processor 120 respectively writes the three sub-completion messages into the storage blocks Q13 to Q15. In still another example, it is assumed that the processor 120 has learned that when being stored in the queue Q1, the processing instruction C4 needs to occupy two storage blocks, and the corresponding completion message M4 needs to occupy a storage block. In this case, the size of the processing instruction C4 is larger, so that the processor 120 may use the size of the processing instruction C4 as the size of the target area T4, and the planned target area T4 includes two storage blocks Q16 and Q17. As shown in FIG. 3, the processing instruction C4 may be divided into two sub-processing instructions C41 and C42, and the two sub-processing instructions are respectively written into the storage blocks Q16 and Q17.

In some embodiments of step S01, when the size of the completion message is greater than the size of the processing instruction, the size of the target area is also greater than the size of the processing instruction. In this case, the processor 120 writes the at least one processing instruction and at least one dummy instruction into the target area T3. In some embodiments, the processor 120 not only writes the processing instruction into the target area, but also writes the dummy instruction into a space in the target area other than the space occupied by the processing instruction. For example, as shown in FIG. 3, the processor 120 may write the processing instruction C3 into the storage block Q13 of the target area T3, and write dummy instructions D31 and D32 into the storage blocks Q14 and Q15 of the target area T3.

In some embodiments of step S03 and step S04, when the size of the processing instruction is greater than the size of the completion message, the size of the target area is also greater than the size of the completion message. In this case, the functional hardware 130 not only generates the completion message, but also generates a dummy message, and the functional hardware 130 writes the at least one completion message and at least one dummy message into the target area T4. In some embodiments, the functional hardware 130 not only writes the completion message into the target area, but also writes the dummy message into a space in the target area other than the space occupied by the completion message. For example, the functional hardware 130 may generate the completion message M4 and a dummy message D41. As shown in FIG. 3, the functional hardware 130 writes the completion message M4 into the storage block Q16 of the target area T4, and writes the dummy message D41 into the storage block Q17 of the target area T4.

In the foregoing embodiment, the writing a dummy instruction or/and a dummy message may be writing a fixed value (for example, 0 or 1), or may be merely preserving a writing space without writing any value.

In some embodiments, the electronic device 100 may further include a register file 150, and the register file 150 may be coupled to the processor 120 and the functional hardware 130 through the bus 140. In some implementation aspects, the register file 150 may be implemented by using an array including a plurality of registers, for example, but not limited to being implemented by using a static random access memory.

Figure 4:
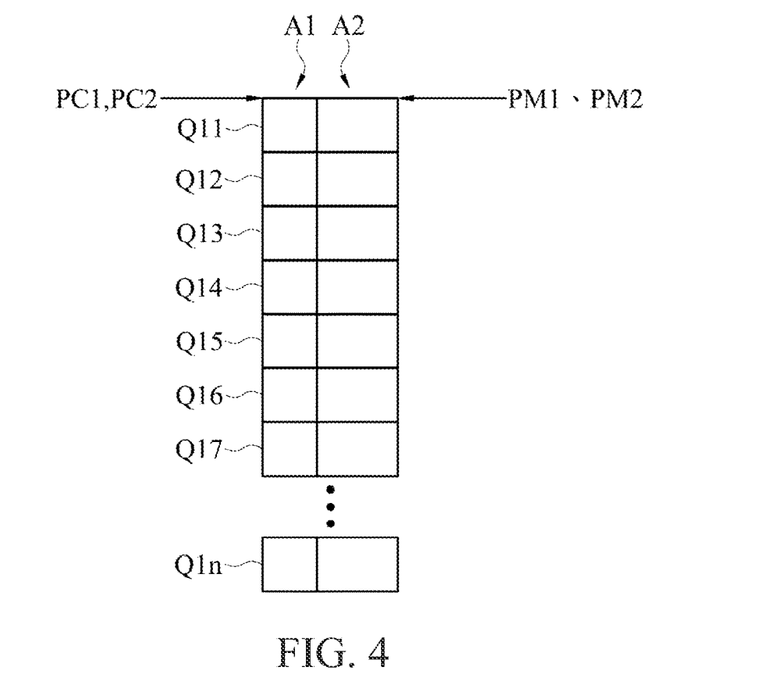
FIG. 4 is a schematic exemplary diagram of an embodiment in which a queue is in an initial state.

Referring to FIG. 1 to FIG. 11, the register file 150 may include an instruction write pointer PC1, an instruction read pointer PC2, a message write pointer PM1, and a message read pointer PM2. The instruction write pointer PC1 is used to indicate a storage position of a latest processing instruction in the queue Q1. The instruction read pointer PC2 is used to indicate a reading position of a processing instruction most recently read from the queue Q1. The message write pointer PM1 is used to indicate a storage position of a latest completion message in the queue Q1. In addition, the message read pointer PM2 is used to indicate a reading position of a completion message most recently read from the queue Q1. In an initial state, the instruction write pointer PC1, the instruction read pointer PC2, the message write pointer PM1, and the message read pointer PM2 may all indicate a starting position of the queue Q1, as shown in FIG. 4.

Figure 5:
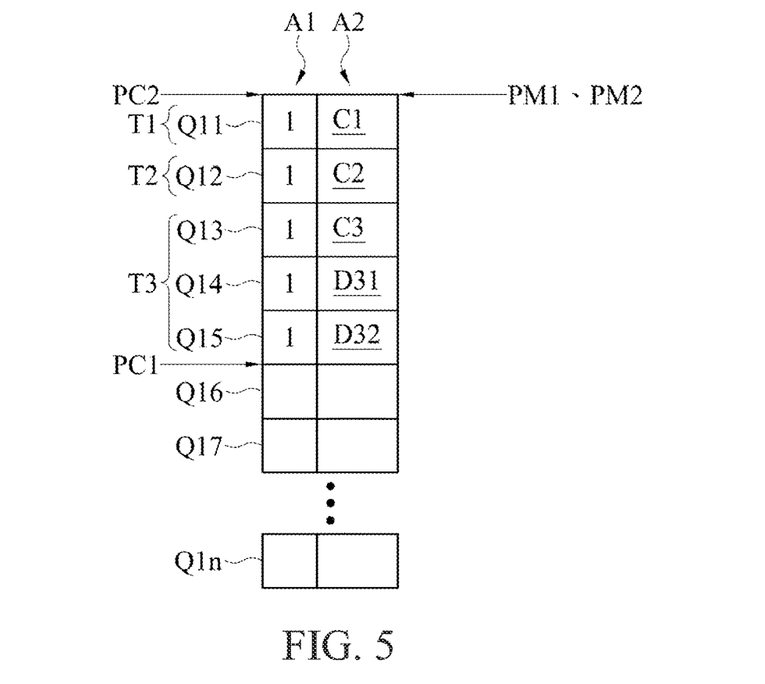
FIG. 5 is a schematic exemplary diagram in which at least one processing instruction is written into at least one target area of a queue.

In some embodiments, after writing at least one of the plurality of processing instructions C1 to C4 into at least one of the plurality of target areas T1 to T4 in step S01, the processor 120 may access the register file 150 through the bus 140, to update the instruction write pointer PC1. For example, as shown in FIG. 5, the processor 120 may access the register file 150 after writing the processing instructions C1 to C3 into the target areas T1 to T3, and update the instruction write pointer PC1 from the starting position to the position of the storage block Q15 in the target area T3.

Figure 6:
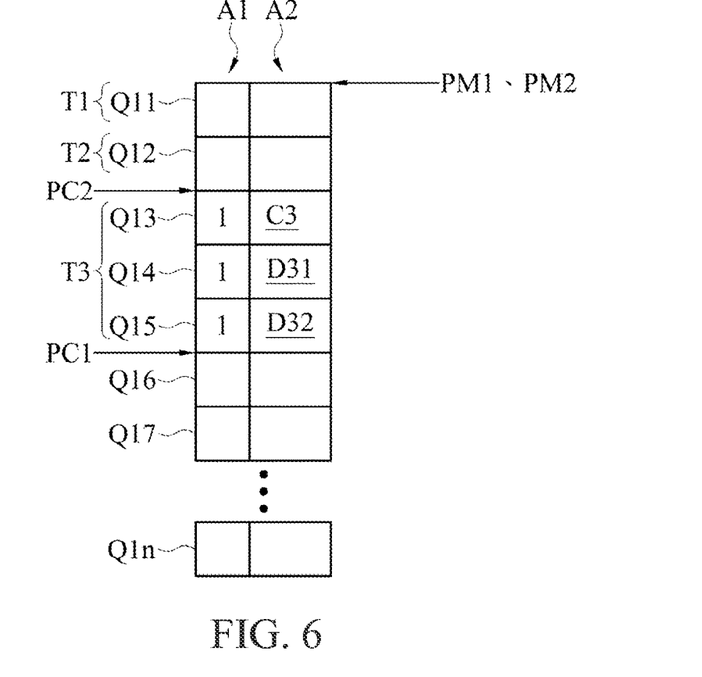
FIG. 6 is a schematic exemplary diagram in which at least one processing instruction is read from the queue in FIG. 5.
Figure 7:
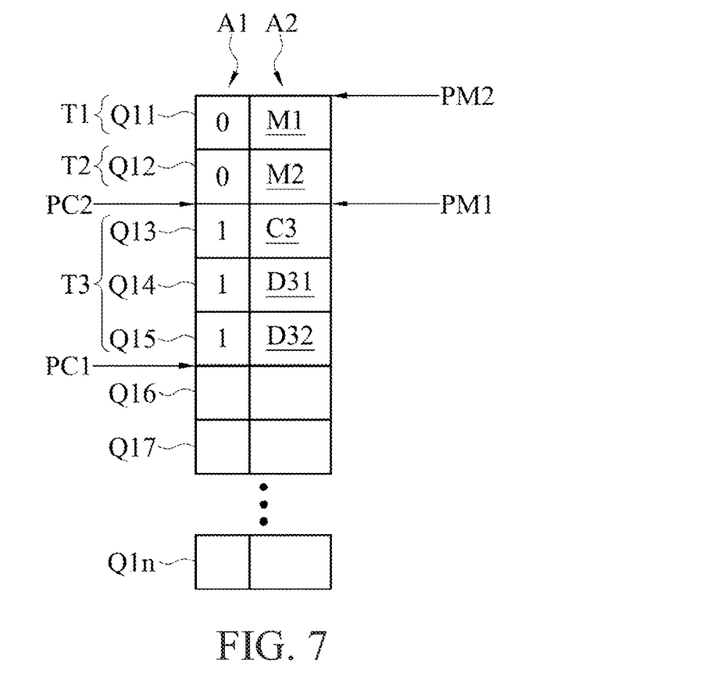
FIG. 7 is a schematic exemplary diagram in which at least one completion message is written into the queue in FIG. 5.
Figure 8:
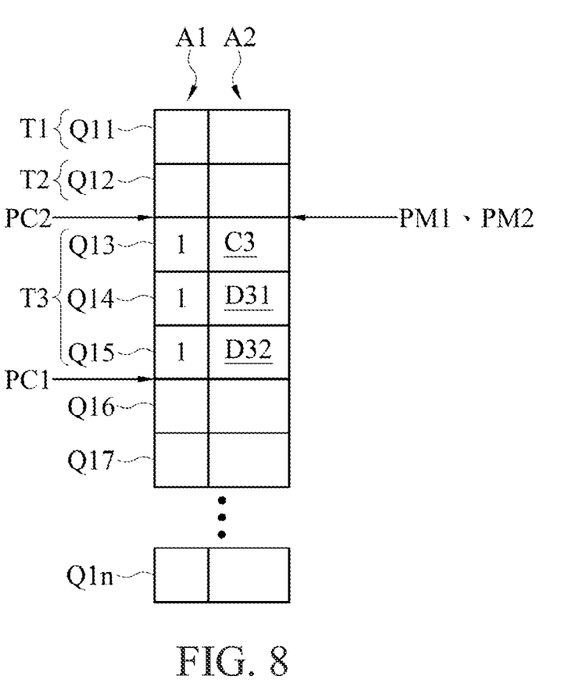
FIG. 8 is a schematic exemplary diagram in which at least one completion message is read from the queue in FIG. 7.

After reading at least one of the plurality of processing instructions C1 to C4 from at least one of the plurality of target areas T1 to T4 in step S02, the functional hardware 130 may access the register file 150 through the bus 140, to update the instruction read pointer PC2. For example, as shown in FIG. 6, the functional hardware 130 may access the register file 150 after reading the processing instructions C1 and C2 from the target areas T1 and T2, and update the instruction read pointer PC2 from the starting position to the position of the storage block Q12 in the target area T2. After writing at least one of the plurality of completion messages M1 to M4 into at least one of the plurality of target areas T1 to T4 in step S04, the functional hardware 130 may access the register file 150 through the bus 140, to update the message write pointer PM1. For example, as shown in FIG. 7, the functional hardware 130 may access the register file 150 after writing the completion messages M1 and M2 into the target areas T1 and T2, and update the message write pointer PM1 from the starting position to the position of the storage block Q12 in the target area T2. After reading at least one of the plurality of completion messages M1 to M4 from at least one of the plurality of target areas T1 to T4 in step S05, the processor 120 may access the register file 150 through the bus 140, to update the message read pointer PM2. For example, as shown in FIG. 8, the processor 120 may access the register file 150 after reading the completion messages M1 and M2 from the target areas T1 and T2, and update the message read pointer PM2 from the starting position to the position of the storage block Q12 in the target area T2.

Figure 9:
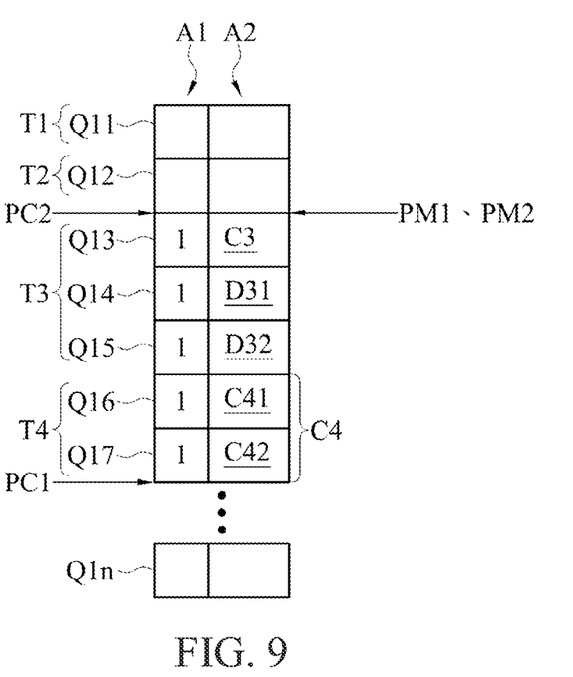
FIG. 9 is a schematic exemplary diagram in which at least one processing instruction is written into the queue in FIG. 8.

In some embodiments of step S01, the processor 120 may first access the register file 150 to obtain a new instruction write pointer PC1, and write, according to the instruction write pointer PC1, at least one of the plurality of processing instructions C1 to C4 into at least one target area next to a target area indicated by the instruction write pointer PC1. For example, when the obtained instruction write pointer PC1 indicates the position of the storage block Q15 in the target area T3 (an implementation aspect as shown in FIG. 8), the processor 120 may write the processing instruction C4 into the target area T4 that is next to the target area indicated by the instruction write pointer PC1, and update the instruction write pointer PC1 to the position of the storage block Q17 in the target area T4 after the writing, as shown in FIG. 9.

In some embodiments of step S02, the functional hardware 130 may first access the register file 150 to obtain a new instruction write pointer PC1 and a new instruction read pointer PC2, and read, according to the instruction write pointer PC1 and the instruction read pointer PC2, at least one processing instruction from a target area next to a target area indicated by the instruction read pointer PC2 to a target area indicated by the instruction write pointer PC1. For example, when the instruction write pointer PC1 indicates the position of the storage block Q17 in the target area T4 and the instruction read pointer PC2 indicates the position of the storage block Q12 in the target area T2 (an implementation aspect as shown in FIG. 9), the functional hardware 130 may read the processing instruction C3 in the target area T3 from the target area next to the target area indicated by the instruction read pointer PC2, that is, the target area T3, to the target area T4 indicated by the instruction write pointer PC1, and update the instruction read pointer PC2 to the position of the storage block Q15 in the target area T3. In addition, in some embodiments, the functional hardware 130 may further calculate a quantity of to-be-executed processing instructions according to the instruction write pointer PC1 and the instruction read pointer PC2.

In some implementation aspects, the functional hardware 130 may parse (or analyze) the processing instruction C3 after reading the processing instruction C3, learn the length of the processing instruction C3 through, for example, but not limited to a header in the processing instruction C3, and then determine that the following dummy instructions D31 and D32 are dummy and do not need to be processed, for example, but not limited to skip reading the dummy instructions D31 and D32 and directly update the instruction read pointer PC2 to the position of the storage block Q15 in the target area T3.

In some embodiments of step S03, the functional hardware 130 may learn a proportional relationship between the processing instruction C3 and the completion message M3 through, for example, but not limited to the header in the processing instruction C3 after parsing the processing instruction C3, and generate the correspondingly proportional completion message M3 after executing the processing instruction C3. For example, if the proportion of the processing instruction C3 to the completion message M3 is 1:3, the functional hardware 130 generates the completion message M3 that can be divided into three sub-completion messages M31 to M33.

Figure 10:
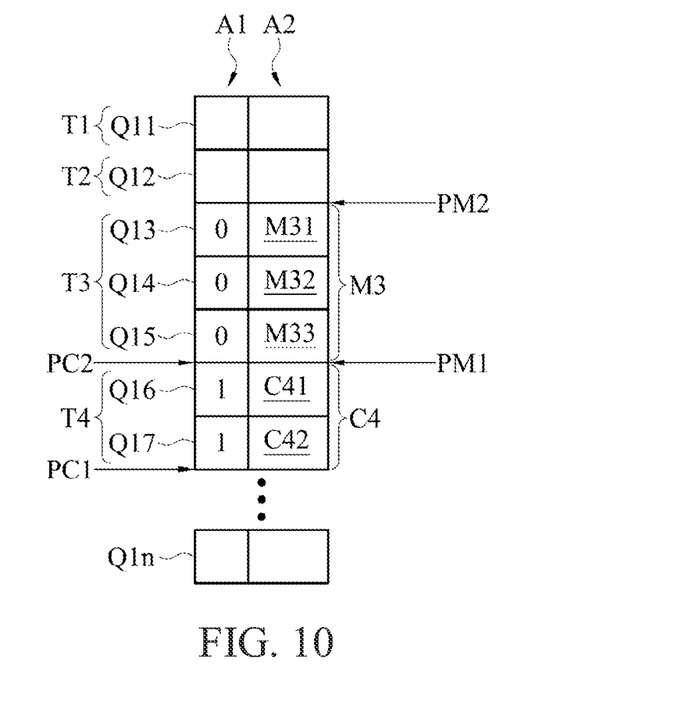
FIG. 10 is a schematic exemplary diagram in which at least one completion message is written into the queue in FIG. 9.

In some embodiments of step S04, the functional hardware 130 may first access the register file 150 to obtain a new message write pointer PM1, and write, according to the message write pointer PM1, at least one of the plurality of completion messages M1 to M4 into at least one target area next to a target area indicated by the message write pointer PM1. For example, when the message write pointer PM1 indicates the position of the storage block Q12 in the target area T2, the functional hardware 130 may write the completion message M3 into the target area T3 that is next to the target area indicated by the message write pointer PM1, and update the message write pointer PM1 to the position of the storage block Q15 in the target area T3, as shown in FIG. 10.

Figure 11:
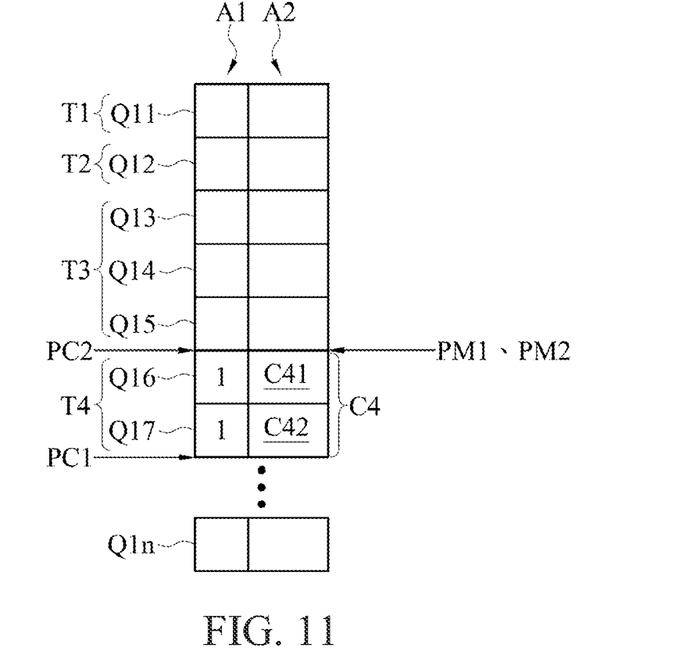
FIG. 11 is a schematic exemplary diagram in which at least one completion message is read from the queue in FIG. 10.

In some embodiments of step S05, the processor 120 may first access the register file 150 to obtain a new message write pointer PM1 and a new message read pointer PM2, and read, according to the message write pointer PM1 and the message read pointer PM2, at least one completion message from a target area next to a target area indicated by the message read pointer PM2 to a target area indicated by the message write pointer PM1. For example, when the message write pointer PM1 indicates the position of the storage block Q15 in the target area T3 and the message read pointer PM2 indicates the position of the storage block Q12 in the target area T2 (an implementation aspect as shown in FIG. 10), the target area next to the target area indicated by the message read pointer PM2 is the target area T3 and is the same as the target area indicated by the message write pointer PM1, so that the processor 120 may read the completion message M3 from the target area T3, and update the message read pointer PM2 to the position of the storage block Q15 in the target area T3, as shown in FIG. 11. In addition, in some embodiments, the processor 120 may further calculate a quantity of to-be-processed completion messages according to the message write pointer PM1 and the message read pointer PM2.

In some implementation aspects, the processor 120 may parse the completion message M4 after reading the completion message M4, and then learn that the following dummy message D41 is dummy and does not need to be processed, for example, but not limited to skip reading the dummy message D41 or read but skip executing the dummy message D41, and directly update the message read pointer PM2 to the position of the storage block Q17 in the target area T4.

In some embodiments, the functional hardware 130 may access the register file 150 to obtain a new message write pointer PM1 and a new message read pointer PM2, and calculate a quantity of to-be-processed completion messages according to the message write pointer PM1 and the message read pointer PM2, and then determine whether interruption is required to notify the processor 120 to process the completion messages.

In some embodiments, each of the target areas T1 to T4 may include a status field A1 and a storage field A2. The status field A1 may be used to indicate whether an instruction or a message is stored in the storage field A2. When writing the processing instructions C1 to C4 into the target areas T1 to T4 in step S01, the processor 120 may write the processing instructions C1 to C4 into the storage fields A2 of the target areas T1 to T4, and write a first value into the status fields A1 of the target areas T1 to T4. When writing the completion messages M1 to M4 into the target areas T1 to T4 in step S04, the functional hardware 130 may write the completion messages M1 to M4 into the storage fields A2 of the target areas T1 to T4, and write a second value into the status fields A1 of the target areas T1 to T4. The second value is different from the first value. The functional hardware 130 controls the writing time of the status field A1 to achieve the effect of at least one target area T1 to T4 being reserved by the functional hardware 130. For example, when the processor 120 finds that the status field A1 is the first value, the processor will determine that the functional hardware 130 has not read the processing instructions C1 to C4. Therefore, the processor 11130 will not use the at least one target area T1 to T4. In some implementation aspects, the first value may be, but is not limited to 1, and the second value may be, but is not limited to 0.

In some embodiments, each of the storage blocks Q11 to Q1n may be divided into the foregoing status field A1 and storage field A2. The processor 120 may write the processing instruction into the storage field A2 of the storage block, and write the first value into the status field A1 of the storage block. The functional hardware 130 may write the completion message into the storage field A2 of the storage block, and write the second value into the status field A1 of the storage block. Particularly, even if a dummy instruction is written, for example, the dummy instructions D31 and D32 are written into the storage fields A2 of the storage blocks Q14 and Q15, the processor 120 still writes the first value into the status fields A1 of the storage blocks Q14 and Q15. Even if a dummy message is written, for example, the dummy message D41 is written into the storage field A2 of the storage block Q17, the functional hardware 130 still writes the second value into the status field A1 of the storage block Q17. In some embodiments, the size of the target area is determined by the sizes of the processing instruction and the completion message. In some embodiments, when the sizes of the processing instruction and the completion message are not the same, the size of the target area is not less than the larger one of the sizes of the processing instruction and the completion message. In some embodiments, when the sizes of the processing instruction and the completion message are not the same, the size of the target area is equal to the larger one of the sizes of the processing instruction and the completion message.

In some embodiments, the functional hardware 130 may parse, through a parsing circuit, the processing instructions C1 to C4 obtained from the queue Q1. In addition, there may be a plurality of pieces of functional hardware 130 in the electronic device 100, and the processing instructions C1 to C4 stored in the same queue Q1 may be used to be executed by a plurality of pieces of functional hardware 130. In this case, the functional hardware 130 may first parse, through the parsing circuit, a processing instruction obtained from the queue Q1, and then distribute the processing instruction to corresponding functional hardware 130 for execution. In some implementation aspects, the parsing circuit may be included in the functional hardware 130, or may be independently disposed and coupled to the functional hardware 130 and the memory 110.

Based on the above, according to the electronic device and the space reusing method in the embodiments of the present invention, a processing instruction is written into a target area in a queue of a memory, and a completion message corresponding to the processing instruction is stored into the same target area, so that the processing instruction and the corresponding completion message can reuse the same storage space in the queue, thereby improving the storage utilization of the memory.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An electronic device, comprising:
a memory, comprising a queue;
a processor, configured to write at least one processing instruction into at least one target area of the queue; and
functional hardware, configured to read the at least one processing instruction from the at least one target area, wherein the functional hardware generates at least one completion message according to the at least one processing instruction, and writes the at least one completion message into the at least one target area after the at least one processing instruction is executed, wherein the at least one completion message corresponds to the at least one processing instruction, and wherein the at least one target areas includes storage locations for instructions and storage locations for completion messages, and wherein the at least one target area includes a status field for each storage location, wherein a value in each status field indicates which one of an instruction and a message corresponding to the instruction is stored in the corresponding storage location,
wherein the processor predetermines the size of the completion message according to the at least one processing instruction, and the processor determines the size of the target area according to the size of the at least one processing instruction and the predetermined size of the completion message, and
wherein when the size of the at least one target area is greater than the size of the at least one completion message, the functional hardware writes the at least one completion message and at least one dummy message into the target area.

2. The electronic device according to claim 1, wherein the processor is configured to read the at least one completion message from the at least one target area.

3. The electronic device according to claim 2, further comprising a register file, wherein the register file comprises an instruction write pointer, an instruction read pointer, a message write pointer, and a message read pointer, wherein
the processor updates the instruction write pointer after writing the at least one processing instruction into the at least one target area;
the functional hardware updates the instruction read pointer after reading the at least one processing instruction from the at least one target area;
the functional hardware updates the message write pointer after writing the at least one completion message into the at least one target area; and
the processor updates the message read pointer after reading the at least one completion message from the at least one target area.

4. The electronic device according to claim 1, wherein when the size of the at least one target area is greater than the size of the at least one processing instruction, the processor writes the at least one processing instruction and at least one dummy instruction into the target area.

5. The electronic device according to claim 1, wherein the at least one target area comprises a status field and a storage field, wherein the processor writes the at least one processing instruction into the storage field and writes a first value into the status field, and the functional hardware writes the at least one completion message into the storage field and writes a second value into the status field.

6. The electronic device according to claim 5, wherein the size of the at least one target area is determined by the sizes of the at least one processing instruction and the at least one completion message.

7. The electronic device according to claim 6, wherein when the sizes of the at least one processing instruction and the at least one completion message are not the same, the size of the at least one target area is not less than the larger one of the sizes of the at least one processing instruction and the at least one completion message.

8. The electronic device according to claim 7, wherein when the sizes of the at least one processing instruction and the at least one completion message are not the same, the size of the at least one target area is equal to the larger one of the sizes of the at least one processing instruction and the at least one completion message.

9. The electronic device according to claim 1, wherein the functional hardware is configured to reserve the at least one target area until the at least one completion message is written into the at least one target area.

10. A space reusing method, comprising:
determining a size of at least one target area according to at least one processing instruction, wherein the at least one target area is in a queue of a memory;
writing the at least one processing instruction into the at least one target area;
reading the at least one processing instruction from the at least one target area;
generating at least one completion message according to the at least one processing instruction;
writing the at least one completion message into the at least one target area after the at least one processing instruction is executed; and
reading the at least one completion message from the at least one target area,
wherein the at least one target areas includes storage locations for instructions and storage locations for completion messages, and wherein the at least one target area includes a status field for each storage location, wherein a value in each status field indicates which one of an instruction and a message corresponding to the instruction is stored in the corresponding storage location,
wherein when the size of the processing instruction is greater than the size of the completion message, the step of writing the at least one completion message into the at least one target area is: writing the at least one completion message and a dummy message into the at least one target area.

11. The space reusing method according to claim 10, comprising:
updating an instruction write pointer in a register file after the at least one processing instruction is written into the at least one target area;
updating an instruction read pointer in the register file after the at least one processing instruction is read from the at least one target area;
updating a message write pointer in the register file after the at least one completion message is written into the at least one target area; and
updating a message read pointer in the register file after the at least one completion message is read from the at least one target area.

12. The space reusing method according to claim 10, wherein when the size of the completion message is greater than the size of the processing instruction, the step of writing the at least one processing instruction into the at least one target area in the queue of the memory is: writing the at least one processing instruction and a dummy instruction into the at least one target area.

13. The space reusing method according to claim 10, wherein the target area comprises a status field and a storage field, wherein the step of writing the at least one processing instruction into the at least one target area in the queue of the memory is: writing the at least one processing instruction into the storage field and writing a first value into the status field; and the step of writing the at least one completion message into the target area is: writing the at least one completion message into the storage field and writing a second value into the status field.

14. The space reusing method according to claim 10, wherein the size of the at least one target area is determined by the sizes of the at least one processing instruction and the at least one completion message.

15. The space reusing method according to claim 14, wherein when the sizes of the at least one processing instruction and the at least one completion message are not the same, the size of the at least one target area is not less than the larger one of the sizes of the at least one processing instruction and the at least one completion message.

16. The space reusing method according to claim 15, wherein when the sizes of the at least one processing instruction and the at least one completion message are not the same, the size of the at least one target area is equal to the larger one of the sizes of the at least one processing instruction and the at least one completion message.

17. The space reusing method according to claim 10, wherein the at least one target area is reserved until the at least one completion message is written into the at least one target area.

* * * * *